(12) United States Patent
Magnusson et al.

(10) Patent No.: US 8,837,047 B2
(45) Date of Patent: Sep. 16, 2014

(54) CHIP-SCALE SLOW-LIGHT BUFFERS FASHIONED WITH LEAKY-MODE RESONANT ELEMENTS AND METHODS OF USING LEAKY-MODE RESONANT ELEMENTS FOR DELAYING LIGHT

(75) Inventors: Robert Magnusson, Arlington, TX (US); Mehrdad Shokooh-Saremi, Plano, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 581 days.

(21) Appl. No.: 12/968,064

(22) Filed: Dec. 14, 2010

(65) Prior Publication Data

US 2011/0181946 A1     Jul. 28, 2011

Related U.S. Application Data

(60) Provisional application No. 61/286,062, filed on Dec. 14, 2009.

(51) Int. Cl.
  *G02B 6/10* (2006.01)
  *G02B 5/18* (2006.01)
(52) U.S. Cl.
  USPC .......................... 359/575; 385/130
(58) Field of Classification Search
  USPC ................. 385/10, 37, 129, 130; 359/575
  See application file for complete search history.

(56) References Cited

U.S. PATENT DOCUMENTS

| | | | |
|---|---|---|---|
| 5,216,680 A * | 6/1993 | Magnusson et al. | 372/20 |
| 6,990,259 B2 * | 1/2006 | Cunningham | 385/12 |
| 7,167,615 B1 * | 1/2007 | Wawro et al. | 385/37 |
| 7,190,859 B2 * | 3/2007 | Greiner et al. | 385/37 |
| 7,218,817 B2 * | 5/2007 | Magnusson et al. | 385/37 |
| 2005/0025422 A1 * | 2/2005 | Magnusson et al. | 385/37 |
| 2006/0193550 A1 * | 8/2006 | Wawro et al. | 385/12 |

OTHER PUBLICATIONS

Magnusson, Shokooh-Saremi, and Wang,"Dispersion Engineering with Leaky-Mode Resonant Photonic Lattices", vol. 18, No. 1 Optics Express, pp. 108-116 (Jan. 4, 2010).*
Schreier et al., "Pulse delay at diffractive structures under resonance conditions", Optics Letters, vol. 23, No. 17, pp. 1337-1339 (Sep. 1998).*
Avrutsky and Sychugov, "Reflection of a beam of finite size from a corrugated waveguide," *J. Mod. Opt.*, 36:1527-1539, 1989.
Brundrett et al., "Effects of modulation strength in guided-mode resonant subwavelength gratings at normal incidence," *J. Opt. Soc. Am. A.*, 17:1221-1230, 2000.
Brundrett et al., "Normal-incidence guided-mode resonant grating filters : design and experimental demonstration," *Opt. Lett.*, 23:700-702, 1998.
Ding and Magnusson, "Band gaps and leaky-wave effects in resonant photonic-crystal waveguides," *Opt. Express*, 15:680-694, 2007.
Ding and Magnusson, "Doubly-resonant single-layer bandpass optical filters," *Opt. Lett.*, 29:1135-1137, 2004.

(Continued)

*Primary Examiner* — Eric Bolda
(74) *Attorney, Agent, or Firm* — Fulbright & Jaworski LLP

(57) ABSTRACT

A method for delaying transmitted light. The method may include illuminating a leaky-mode resonant element with light pulses of short duration and sequences of such pulses. The leaky-mode resonant element may include a spatially modulated periodic layer and may be configured so that at least some of the light is transmitted in a delayed manner.

24 Claims, 11 Drawing Sheets

(56) References Cited

OTHER PUBLICATIONS

Ding and Magnusson, "Resonant leaky-mode spectral-band engineering and device applications," *Opt. Express*, 12:5661-5674, 2004.
Ding and Magnusson, "Use of nondegenerate resonant leaky modes to fashion diverse optical spectra," *Opt. Express*, 12:1885-1891, 2004.
Eberhart and Kennedy, "Particle swarm optimization," in *Proceedings of IEEE Conference on Neural Networks*, 1942-1948, 1995.
Gale et al., "Zero-order diffractive microstructures for security applications," *Proc. SPIE on Optical Security and Anticounterfeiting Systems*, 1210:83-89, 1990.
Gaylord and Moharam, "Analysis and applications of optical diffraction by gratings," *Proc. IEEE*, 73:894-937, 1985.
Goldberg, *Genetic Algorithms in Search, Optimization and Machine Learning*, Addison-Wesley, 1989.
Golubenko et al., "Total reflection of light from a corrugated surface of a dielectric waveguide," *Sov. J. Quantum Electron.*, 15:886-887, 1985.
Haupt and Haupt, *Practical Genetic Algorithms*, 2nd ed., Wiley, 2004.
Joannopoulos et al., *Photonic Crystals: Molding the Flow of Light*, Princeton, pp. 3-7, 1995.
Lee et al., "Agarose-gel based guided-mode resonance humidity sensor," *IEEE Sensors J.*, 7:409-414, 2007.
Lee et al., "Silicon-layer guided-mode resonance polarizer with 40 nm bandwidth," *IEEE Photonics Technol. Lett.*, 20:1857-1859, 2008.
Lenz and Madsen, "General optical all-pass filter structures for dispersion control," *J. Lightwave Technol.*, 17:1248-1254, 1999.
Lenz et al., "Optical delay lines based on optical filters," *IEEE J. Quantum Electron.*, 37, 525-532, 2001.
Liu et al., "High-efficiency guided-mode resonance filter," *Opt. Lett.*, 23:1556-1558, 1998.
Madsen and Lenz, "Optical all-pass filters for phase response design with applications for dispersion compensation," *IEEE Photonics Technol. Lett.*, 10:994-996, 1998.
Madsen et al., "Integrated all-pass filters for tunable dispersion and dispersion slope compensation," *IEEE Photonics Technol. Lett.*, 11:1623-1625, 1999.
Magnusson and Ding, "MEMS tunable resonant leaky mode filters," *IEEE Photonics Technol. Lett.*, 18:1479-1481, 2006.
Magnusson and Ding, "Spectral-band engineering with interacting resonant leaky modes in thin periodic films," *Proc. SPIE Micromachining Technology for Microoptics and Nanooptics*, 5720:119-129, 2005.
Magnusson and Shokooh-Saremi, "Physical basis for wideband resonant reflectors," *Opt. Express*, 16:3456-3462, 2008.
Magnusson and Shokooh-Saremi, "Widely tunable guided-mode resonance nanoelectromechanical RGB pixels," *Opt. Express*, 15:10903-10910, 2007.
Magnusson and Wang, "New principle for optical filters," *Appl. Phys. Lett.*, 61:1022-1024, 1992.
Magnusson et al., "Photonic devices enabled by waveguide-mode resonance effects in periodically modulated films," in *Nano- and Micro-Optics for Information Systems*, L. A. Eldada, ed., *Proc. SPIE*, 5225:20-34, 2003.
Mashev and Popov, "Zero order anomaly of dielectric coated gratings," *Opt. Comm.*, 55:377-380, 1985.
Mateus et al., "Broad-band mirror (1.12-1.62 μm) using a subwavelength grating," *IEEE Photonics Tech. Lett.*, 16:1676-1678, 2004.
International Publication WO 2005/089098 A2 for PCT Application No. PCT/US2005/001416, published Sep. 29, 2005, 37 pages.
Mirotznik et al., "Three-dimensional analysis of subwavelength diffractive optical elements with the finite-difference time-domain method," *Appl. Opt.*, 39:2878-2879, 2000.
Moharam et al., "Stable implementation of the rigorous coupled-wave analysis for surface-relief gratings: Enhanced transmittance matrix approach," *J. Opt. Soc. Am. A*, 12:1077-1086, 1995.
Nakagawa et al., "Ultrashort pulse propagation in near-field periodic diffractive structures by use of rigorous coupled-wave analysis," *J. Opt. Soc. Am. A*, 18:1072-1081, 2001.
Notomi et al., "Large-scale arrays of ultrahigh-Q coupled nanocavities," *Nature Photon.*, 2:741-747, 2008.
Notomi et al., "Ultrahigh-$Q$ nanocavity with 1D photonic gap," *Optics Express*, 16(15):11095-11102, 2008.
Notomi et al., "Waveguides, resonators and their coupled elements in photonic crystal slabs," *Optics Express*, 12(8):1551-1561, 2004.
Parra and Lowell, "Toward applications of slow light technology," *Opt. Photon. News*, pp. 40-45, 2007.
Peng and Morris, "Experimental demonstration of resonant anomalies in diffraction from two-dimensional gratings," *Opt. Lett.*, 21:549-551, 1996.
Popov et al., "Theoretical study of anomalies of coated dielectric gratings," *Opt. Acta*, 33:607-619, 1986.
Priambodo et al., "Fabrication and characterization of high-quality waveguide-mode resonant optical filters," *Appl. Phys. Lett.*, 83:3248-3250, 2003.
Rasras et al., "Integrated resonance-enhanced variable optical delay lines," *IEEE Photonics Technol. Lett.*, 17:834-836, 2005.
Robinson and Rahmat-Samii, "Particle swarm optimization in electromagnetics," *IEEE Trans. Ant. Propagat.*, 52:397-407, 2004.
Rosenblatt et al., "Resonant grating waveguide structure," *IEEE J. Quantum Electron.*, 33:2038-2059, 1997.
Sakoda, *Optical Properties of Photonic Crystals*, Springer Series in Optical Science, pp. 1-11, 2001.
Schreier et al., "Pulse delay at diffractive structures under resonance conditions," *Opt. Lett.*, 23:1337-1339, 1998.
Shokooh-Saremi and Magnusson, "Particle swarm optimization and its application to the design of diffraction grating filters," *Opt. Lett.*, 32:894-896, 2007.
Shokooh-Saremi and Magnusson, "Wideband leaky-mode resonance reflectors: Influence of grating profile and sublayers," *Opt. Express*, 16:18249-18263, 2008.
Suh and Fan, "All-pass transmission or flattop reflection filters using a single photonic crystal slab," *Appl. Phys. Lett.*, 84:4905-4907, 2004.
Taflove and Hagness, *Computational Electrodynamics: The Finite-Difference Time-Domain Method*, 2nd ed., Artech House, pp. 569-579, 2000.
Tanabe et al., "Large pulse delay and small group velocity achieved using ultrahigh-$Q$ photonic crystal nanocavities," *Optics Express*, 15(12):7826-7839, 2007.
Tanabe et al., "Trapping and delaying photons for one nanosecond in an ultrasmall high-$Q$ photonic-crystal nanocavity," *Nature Photonics*, 1:49-52, 2007.
Tibuleac and Magnusson, "Narrow-linewidth bandpass filters with diffractive thin-film layers," *Opt. Lett.*, 26:584-586, 2001.
Tibuleac and Magnusson, "Reflection and transmission guided-mode resonance filters," *J. Opt. Soc. Am. A*, 14:1617-1626, 1997.
Vallius et al., "Pulse deformations at guided-mode resonance filters," *Opt. Express*, 10:840-843, 2002.
Vincent and Neviere, "Corrugated dielectric waveguides: A numerical study of the second-order stop bands," *Appl. Phys.*, 20:345-351, 1979.
Wang and Magnusson, "Theory and applications of guided-mode resonance filters," *Appl. Opt.*, 32:2606-2613, 1993.
Xia et al., "Ultracompact optical buffers on a silicon chip," *Nature Photon.*, 1:65-71, 2006.
Yariv and Yeh, *Photonics: Optical Electronics in Modern Communications*, 6th edition, Oxford University Press, New York, pp. 539-545, 2007.

\* cited by examiner

CHIP-SCALE SLOW-LIGHT BUFFERS FASHIONED WITH LEAKY-MODE RESONANT ELEMENTS AND METHODS OF USING LEAKY-MODE RESONANT ELEMENTS FOR DELAYING LIGHT

CROSS REFERENCE TO RELATED APPLICATION

This application claims priority to U.S. Provisional Patent Application No. 61/286,062, filed Dec. 14, 2009, which is incorporated reference in its entirety.

STATEMENT REGARDING FEDERALLY SPONSORED RESEARCH

This invention was made with government support under grant number ECCS-0925774 awarded by the National Science Foundation. The government has certain rights in the invention.

BACKGROUND

1. Field

This invention relates to methods of delaying light using leaky-mode resonant elements. The methods and devices disclosed can be applied, for example, in dispersion management and engineering in telecommunication systems, in laser systems, in optical logic devices, and in nanoelectronic and nanophotonic chips.

2. Description of the Related Art

Materials that are artificially structured on a nanoscale exhibit electronic and photonic properties that differ dramatically from those of the corresponding bulk entity. In particular, subwavelength photonic lattices are of immense interest owing to their applicability in numerous optical systems and devices including communications, medicine, and laser technology [J. D. Joannopoulos, R. D. Meade, and J. N. Winn, Photonic Crystals: Molding the Flow of Light, (Princeton, 1995); A. Yariv and P. Yeh, Photonics: Optical Electronics in Modern Communications, 6th edition (Oxford University Press, New York, 2007); K. Sakoda, Optical Properties of Photonic Crystals (Springer-Verlag, Berlin, 2001)]. When the lattice is confined to a layer, thereby forming a periodic waveguide, an incident optical wave may undergo a guided-mode resonance (GMR) on coupling to a leaky eigenmode of the layer system. The external spectral signatures can have complex shapes with high efficiency in both reflection and transmission [P. Vincent and M. Neviere, "Corrugated dielectric waveguides: A numerical study of the second-order stop bands," Appl. Phys. 20, 345-351 (1979); L. Mashev and E. Popov, "Zero order anomaly of dielectric coated gratings," Opt. Comm. 55, 377-380 (1985); E. Popov, L. Mashev, and D. Maystre, "Theoretical study of anomalies of coated dielectric gratings," Opt. Acta 33, 607-619 (1986); G. A. Golubenko, A. S. Svakhin, V. A. Sychugov, and A. V. Tishchenko, "Total reflection of light from a corrugated surface of a dielectric waveguide," Soy. J. Quantum Electron. 15, 886-887 (1985); I. A. Avrutsky and V. A. Sychugov, "Reflection of a beam of finite size from a corrugated waveguide," J. Mod. Opt. 36, 1527-1539 (1989); R. Magnusson and S. S. Wang, "New principle for optical filters," Appl. Phys. Lett. 61, 1022-1024 (1992); S. S. Wang and R. Magnusson, "Theory and applications of guided-mode resonance filters," Appl. Opt. 32, 2606-2613 (1993)].

It has been shown that subwavelength periodic leaky-mode waveguide films with one-dimensional periodicity provide diverse spectral characteristics such that even single-layer elements can function as narrow-line bandpass filters, polarized wideband reflectors, wideband polarizers, polarization-independent elements, and wideband antireflection films [Y. Ding and R. Magnusson, "Resonant leaky-mode spectral-band engineering and device applications," Opt. Express 12, 5661-5674 (2004); Y. Ding and R. Magnusson, "Use of nondegenerate resonant leaky modes to fashion diverse optical spectra," Opt. Express, 12, 1885-1891 (2004)]. The spectra can be further engineered with additional layers [M. Shokooh-Saremi and R. Magnusson, "Wideband leaky-mode resonance reflectors: Influence of grating profile and sublayers," Opt. Express 16, 18249-18263 (2008)]. The relevant physical properties of these elements can be explained in terms of the structure of the second (leaky) photonic stopband and its relation to the symmetry of the periodic profile. The interaction dynamics of the leaky modes at resonance contribute to sculpting the spectral bands. The leaky-mode spectral placement, their spectral density, and their levels of interaction strongly affect device operation and functionality [Y. Ding and R. Magnusson, "Resonant leaky-mode spectral-band engineering and device applications," Opt. Express 12, 5661-5674 (2004)]. There has been a considerable amount of research performed on the spectral attributes of these elements with many useful applications proposed. In contrast, little has been done to understand their dispersive properties and related slow-light applications.

Optical delay lines have important roles in communication systems and in radio-frequency (RF) photonics. They are common in optical time-division multiplexed communication systems for synchronization and buffering and in RF phased arrays for beam steering [G. Lenz, B. J. Eggleton, C. K. Madsen, and R. E. Slusher, "Optical delay lines based on optical filters," IEEE J. Quantum Electron. 37, 525-532 (2001)]. These delay lines are implemented, for example, as free-space links, fiber-based links, fiber-Bragg gratings, and ring resonators. The delay properties are based on the phase response of the medium or filter in which the delay line is implemented as discussed in detail by Lenz et al. in [G. Lenz, B. J. Eggleton, C. K. Madsen, and R. E. Slusher, "Optical delay lines based on optical filters," IEEE J. Quantum Electron. 37, 525-532 (2001)]. Many examples of practical delay systems are reported in [C. K. Madsen and G. Lenz, "Optical all-pass filters for phase response design with applications for dispersion compensation," IEEE Photonics Technol. Lett. 10, 994-996 (1998); G. Lenz and C. K. Madsen, "General optical all-pass filter structures for dispersion control," J. Lightwave Technol. 17, 1248-1254 (1999); C. K. Madsen, G. Lenz, A. J. Bruce, M. A. Cappuzzo, L. T. Gomez, and R. E. Scotti, "Integrated all-pass filters for tunable dispersion and dispersion slope compensation," IEEE Photonics Technol. Lett. 11, 1623-1625 (1999); M. S. Rasras, C. K. Madsen, M. A. Cappuzzo, E. Chen, L. T. Gomez, E. J. Laskowski, A. Griffin, A. Wong-Foy, A. Gasparyan, A. Kasper, J. Le Grange, and S. S. Patel, "Integrated resonance-enhanced variable optical delay lines," IEEE Photonics Technol. Lett. 17, 834-836 (2005)] using all-pass optical filters.

Advances in nanofabrication and nanolithography are placing the long-awaited photonic integrated circuit in view as an attainable goal. The all-optical networks of the future will bypass optical-to-electrical converters, thereby eliminating associated noise and considerably reducing the attendant bit error rates. As discussed by Parra and Lowell, all-optical processing requires slow-light-enabled synchronizers, buffers, switches, and multiplexers [E. Parra and J. R. Lowell, "Toward applications of slow light technology," Opt. Photon. News, 40-45 (November 2007)]. The technology needed to generate these functions for mass deployment is not available today, but there is a considerable amount of research being devoted to develop it. Means to realize these valuable slow-light applications include stimulated (Brillouin, Raman) scattering in fibers, semiconductor optical amplifiers, 2D photonic crystals, atomic vapors, and high-finesse ring resonators [E. Parra and J. R. Lowell, "Toward applications of slow light technology," Opt. Photon. News, 40-45 (November 2007)].

Previous small-footprint devices include devices such as 2D photonic-crystal (PhC)-based micro-resonator chips [M. Notomi, E. Kuramochi, and T. Tanabe, "Large-scale arrays of ultrahigh-Q coupled nanocavities," Nature Photon. 2, 741-747 (2008); F. Xia, L. Sekaric, and Y. Vlasov, "Ultracompact optical buffers on a silicon chip," Nature Photon. 1, 65-71 (2006)]. These coupled-resonator optical waveguides (CROW) may contain hundreds of high-Q cavities within a PhC lattice. These cavities, formed by slightly offset lattice holes, are perhaps ~2000 nm in diameter. Experimentally, CROW structures can attain group velocity below 0.01 c and long group delays as shown by Notomi et al. [M. Notomi, E. Kuramochi, and T. Tanabe, "Large-scale arrays of ultrahigh-Q coupled nanocavities," Nature Photon. 2, 741-747 (2008)].

The amplitude-based spectral response of leaky-mode elements has been extensively investigated. Although the phase response of these elements has received less attention, there has been some investigation in this area. For example, Schreier et al. treated a sinusoidally modulated waveguide grating at oblique incidence, computing the phase variation of the reflectance near resonance relative to modulation strength [F. Schreier, M. Schmitz, and 0. Bryngdahl, "Pulse delay at diffractive structures under resonance conditions," Opt. Lett. 23, 1337-1339 (1998)]. They quantified the degree to which the structural parameters control the amount of delay achievable with computed values of delay ranging from sub-ps to ~40 ps depending on conditions. Using a finite-difference time-domain computational approach, Mirotznik et al. evaluated the temporal response of a subwavelength dielectric grating that we designed previously as a reflection-type GMR element [M. S. Mirotznik, D. W. Prather, J. N. Mait, W. A. Beck, S. Shi, and X. Gao, "Three-dimensional analysis of subwavelength diffractive optical elements with the finite-difference time-domain method," Appl. Opt. 39, 2878-2879, (2000); S. Tibuleac and R. Magnusson, "Reflection and transmission guided-mode resonance filters," J. Opt. Soc. Am. A 14, 1617-1626 (1997)]. The model input pulse was Gaussian with center wavelength of 510 nm, spectral width of 5000 nm, and temporal pulse width of ~5 fs. They noted that the reflected energy persisted for ~1 ps after the incident field decayed. Later, Suh et al. designed a 2D photonic-crystal-slab-type GMR transmission filter computing the resonance amplitude, transmission spectrum, and group delay. For a 1.2 µm thick slab, a peak delay of about 10 ps was obtained at 1550 nm; the spectral width of the response was ~0.8 nm [W. Suh and S. Fan, "All-pass transmission or flattop reflection filters using a single photonic crystal slab," Appl. Phys. Lett. 84, 4905-4907 (2004)]. Nakagawa et al. presented a method to model ultra-short optical pulse propagation in periodic structures, based on the combination of Fourier spectrum decomposition and rigorous coupled-wave analysis (RCWA) [W. Nakagawa, R. Tyan, P. Sun, F. Xu, and Y. Fainman, "Ultrashort pulse propagation in near-field periodic diffractive structures by use of rigorous coupled-wave analysis," J. Opt. Soc. Am. A 18, 1072-1081 (2001)]. They simulated an incident pulse (167 fs) on a resonant grating supporting two modes and found that two pulses were transmitted with shape similar to the excitation pulse shape. Vallius et al. modeled spatial and temporal pulse deformations generated by GMR filters. They illuminated the structure with a Gaussian temporal pulse of 2 ps duration and 633 nm wavelength. Lateral spread and temporal decompression were observed in the reflected and transmitted pulses [T. Vallius, P. Vahimaa, and J. Turunen, "Pulse deformations at guided-mode resonance filters," Opt. Express 10, 840-843, (2002)]. As the spectrum of the pulse was not well accommodated by the GMR element, the reflection efficiency of the pulse was relatively low.

SUMMARY

A method for delaying transmitted light is presented. In some embodiments, the method may include illuminating a leaky-mode resonant element with light for a time period of no more than 1 nanosecond. The leaky-mode resonant element may be configured so that at least some of the light is transmitted in a delayed manner. In some embodiments, all of the light is transmitted in a delayed manner.

In some embodiments of the method, the time period may be less than 100 picoseconds. Also, the light may have a wavelength of 1.5 microseconds (µm) to 1.7 µm, including 1.6 µm to 1.7 µm. In some embodiments, the delay involved (or the storage involved) may more than 5 picoseconds. In some embodiments, the delay/storage may be more than 25 picoseconds.

In some embodiments, the leaky-mode resonant element may have a spatially modulated periodic layer that includes a first material having a first index of refraction and a second material having a second index of refraction. In some embodiments, the leaky-mode resonant element may have a spatially modulated periodic layer that includes silicon and/or germanium.

In some embodiments, the leaky-mode resonant element may include a plurality of spatially modulated periodic layers. Also, the leaky-mode resonant element may include a cavity between a first spatially modulated periodic layer and a second spatially modulated periodic layer. In some embodiments, the cavity may include air.

In some embodiments, the leaky-mode resonant element may include a spatially modulated periodic layer that has one-dimensional periodicity. Also, the leaky-mode resonant element may have a spatially modulated periodic layer that has two-dimensional periodicity. In some embodiments, the leaky-mode resonant element may have a spatially modulated periodic layer that has a profile selected from the group consisting of binary profile, rectangular profile, trapezoidal profile, sinusoidal profile, and triangular profile.

A method for delaying transmitted light (or for storing light temporarily) is also presented that may include receiving, at a leaky-mode resonant element, light for a time period of no more than 1 nanosecond, where the leaky-mode resonant element is configured so that at least some of the light is transmitted in a delayed manner. In some embodiments, all of the light is transmitted in a delayed manner.

A method for delaying transmitted light is also presented that may include illuminating a leaky-mode resonant element with at least two distinct pulses of light. The leaky-mode resonant element may be configured so that at least some of each distinct pulse of light is transmitted in a delayed manner. In some embodiments the illuminating may include illuminating a leaky-mode resonant element with two or more distinct pulses of light over a time period of no more than one second. In some embodiments the illuminating may include illuminating a leaky-mode resonant element with two or more distinct pulses of light over a time period of no more than one millisecond. In some embodiments the illuminating may include illuminating a leaky-mode resonant element with two or more distinct pulses of light over a time period of no more than one microsecond. In some embodiments the illuminating may include illuminating a leaky-mode resonant element with two or more distinct pulses of light over a time period of no more than 100 nanoseconds. In some embodiments the illuminating may include illuminating a leaky-mode resonant element with two or more distinct pulses of light over a time period of no more than 50 nanoseconds. In some embodiments the illuminating may include illuminating a leaky-mode resonant element with two or more distinct pulses of light over a time period of no more than 10 nanoseconds. In some embodiments the illuminating may include illuminating a leaky-mode resonant element with two or more distinct pulses of light over a time period of no more than 4 nanoseconds. In some embodiments the illuminating may include illuminating a leaky-mode resonant element with two or more distinct pulses of light over a time period of no more than one nanosecond. In some embodiments of the present methods, the illuminating may include more than two pulses of light and/or the time period may be less than one nanosecond.

A method of delaying transmitted light is also presented that may include receiving, at a leaky-mode resonant element, at least two distinct pulses of light. The leaky-mode resonant element may be configured so that at least some of each distinct pulse of light is transmitted in a delayed manner. In some embodiments the receiving may include receiving, at a the element, two or more distinct pulses of light over a time period of no more than one second. In some embodiments the receiving may include receiving, at a leaky-mode resonant element, two or more distinct pulses of light over a time period of no more than one millisecond. In some embodiments the receiving may include receiving, at a leaky-mode resonant element, two or more distinct pulses of light over a time period of no more than one microsecond. In some embodiments the receiving may include receiving, at a leaky-mode resonant element, two or more distinct pulses of light over a time period of no more than 100 nanoseconds. In some embodiments the receiving may include receiving, at a leaky-mode resonant element, two or more distinct pulses of light over a time period of no more than 50 nanoseconds. In some embodiments the receiving may include receiving, at a leaky-mode resonant element, two or more distinct pulses of light over a time period of no more than 10 nanoseconds. In some embodiments the receiving may include receiving, at a leaky-mode resonant element, two or more distinct pulses of light over a time period of no more than 4 nanoseconds. In some embodiments the receiving may include receiving, at a leaky-mode resonant element, two or more distinct pulses of light over a time period of no more than one nanosecond. In some embodiments of the present methods, the receiving may include receiving more than two pulses of light and/or the time period may be less than one nanosecond.

Some embodiments of the present methods include temporarily storing information embodied in an optical signal without converting the optical signal to an electrical signal.

Some embodiments of the present devices include the present leaky-mode resonant elements configured to delay light that is received as a pulse. Some of the present devices include delay buffers that have one or more of the present leaky-mode resonant elements.

The term "coupled" is defined as connected, although not necessarily directly, and not necessarily mechanically.

The terms "a" and "an" are defined as one or more unless this disclosure explicitly requires otherwise.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Any embodiment of any of the present devices and methods can consist of or consist essentially of—rather than comprise/include/contain/have—any of the described elements/steps and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

Figure 1:
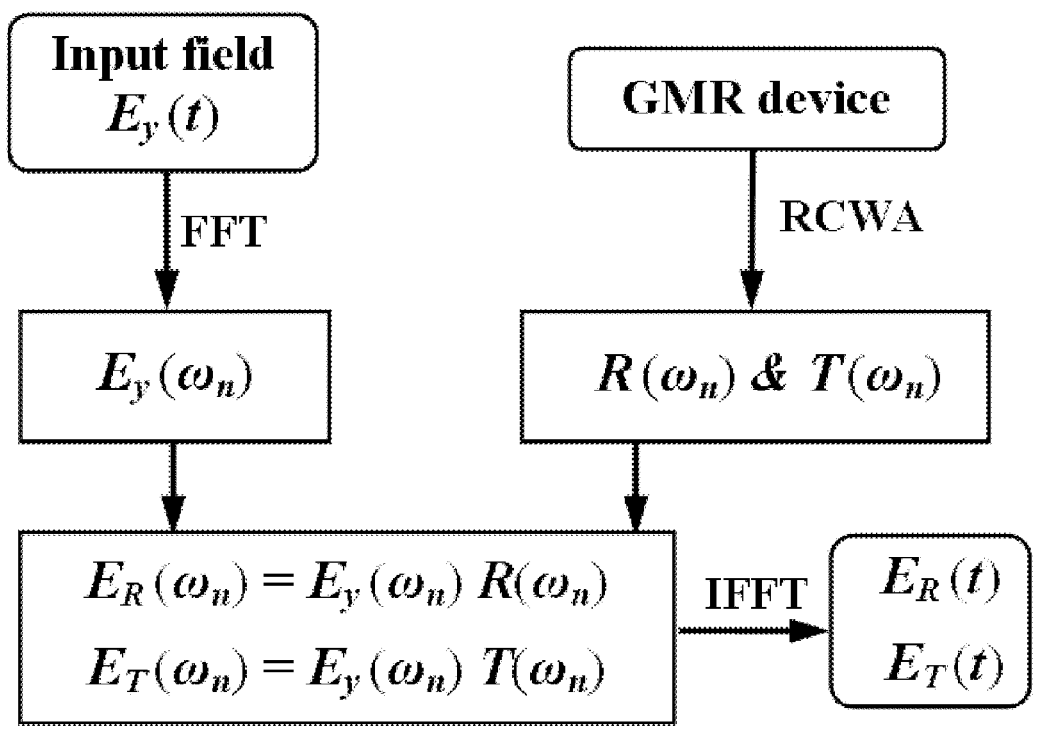
FIG. 1 shows a flow chart summarizing the computational procedure utilized to obtain the output pulse shapes in the wavelength (spectral) domain and in the time domain. FFT: Fast Fourier Transform, RCWA: Rigorous Coupled-Wave Analysis, and IFFT: Inverse Fast Fourier Transform.

Disclosed are leaky-mode resonant elements that can be used to delay light. Such devices may be used for this purpose in, for example, telecommunication applications. For instance, embodiments of the present methods and devices may be used to delay a packet of information. Delaying a packet of information using an embodiment of the present leaky-mode resonant elements temporarily stores it. Accordingly, the present methods may also be characterized as methods of storing light. Devices that can temporarily store information embodied in an optical signal without converting the optical signal to an electrical signal may be smaller and/or faster than a device that converts an optical signal to an electrical signal in order to store information embodied in the optical signal.

The example devices discussed below, including those in the Examples, have been designed and the accompanying discussion relates to their designed features and planned operation. The Examples are not discussing devices that have been physically built and tested, though one of ordinary skill in the art having the benefit of this disclosure will understand how to fabricate our devices.

In this disclosure, the examples presented include layers with one-dimensional (1D) binary modulation. For simplicity and ease of design, it is assumed that the periodic layers are transversely infinite and the materials are lossless. The spectra and phase were calculated with computer codes based on rigorous coupled-wave analysis (RCWA) of wave propagation in periodic media [T. K. Gaylord and M. G. Moharam, "Analysis and applications of optical diffraction by gratings," Proc. IEEE 73, 894-937 (1985); M. G. Moharam, D. A. Pommet, E. B. Grann, and T. K. Gaylord, "Stable implementation of the rigorous coupled-wave analysis for surface-relief gratings: Enhanced transmittance matrix approach," J. Opt. Soc. Am. A 12, 1077-1086 (1995)]. RCWA was used to compute the time response of the disclosed elements. A transform-limited TE-polarized Gaussian pulse is represented as:

$$E_y(t) = E_0 \exp\left[-\frac{(t-t_0)^2}{T^2}\right] \exp[j\omega_0(t-t_0)] \quad (1)$$

where $E_0$ is the amplitude of the pulse; T is the temporal pulse width $(T = \Delta\tau(2 \ln 2)^{-1/2})$; $\Delta\tau$ is the full width at half maximum (FWHM) of $|E_y(t)|^2$; $t_0$ is the pulse-peak offset; $\omega_0 = 2\pi c/\lambda_0$ is the central angular frequency and c and $\lambda_0$ are the speed of light and the wavelength in vacuum, respectively. To use RCWA for analysis, the incident Gaussian pulse was decomposed into its monochromatic Fourier components (plane waves), which was performed by the Fourier transformation and discretization. These discrete monochromatic components were then treated independently by an RCWA analysis technique that at a given incident angle provides the complex reflection coefficients $R(\omega_n)$ (or $R(\lambda_n)$) and complex transmission coefficients $T(\omega_n)$ (or $T(\lambda_n)$) of each diffraction order. In addition, the independent analysis of each monochromatic component facilitated the inclusion of material dispersion effects. The reflected pulse $E_R(\omega_n)$ and transmitted pulse $E_T(\omega_n)$ in the frequency domain for a specific diffraction order are thus given by:

$$E_R(\omega_n) = E_y(\Omega_n) R(\omega_n) \quad (2)$$

$$E_T(\omega_n) = E_y(\Omega_n) T(\omega_n) \quad (3)$$

To obtain the time domain representation of the reflected and transmitted pulses, an inverse Fourier transformation was performed. Since the frequency domain representation of the fields is discrete and finite, a Riemann sum can take the place of the integral in the inverse Fourier transformation. In other words, the reflected and transmitted fields can be, and were, obtained by superimposing the resulting spectral components from Eqs. (2) and (3), with the Fourier kernel included in the expression for the fields $E_R(t; \omega_n)$ and $E_T(t; \omega_n)$.

FIG. 1 clarifies the computational method. Utilizing this technique, one can find the output pulse shape and its delay with respect to the input pulse over a wide range of pulse widths (~several femtoseconds (fs) to hundreds of picoseconds (ps)). The time delay ($\tau$) and delay dispersion (D) are calculated by:

$$\tau = (\lambda^2/2\pi c) d\phi/d\lambda \quad (4)$$

$$D = d\tau/d\lambda \quad (5)$$

where $\phi$ is the wavelength ($\lambda$) dependent phase in reflection or transmission [A. Yariv and P. Yeh, Photonics: Optical Electronics in Modern Communications, 6th edition (Oxford University Press, New York, 2007); G. Lenz, B. J. Eggleton, C. K. Madsen, and R. E. Slusher, "Optical delay lines based on optical filters," IEEE J. Quantum Electron. 37, 525-532 (2001)].

To design the leaky-mode resonance elements disclosed herein, a robust evolutionary technique known as particle swarm optimization (PSO) was used. Although there are several well-known methods for analysis of diffraction gratings, design of these elements with strictly specified spectral properties is generally a challenging problem. Here, "spectra" refer to wavelength (or frequency) spectra as well as to angular spectra. Design and synthesis techniques based on evolutionary strategies (mainly genetic algorithms) have found applications in this area. Particle swarm optimization (PSO) is a robust, stochastic evolutionary strategy useful in electromagnetic design problems. The algorithm finds the optimal solution by moving the particles in the search space. PSO lets every individual within the swarm move from a given point to a new one with a velocity based on a weighted combination of the individual's current velocity, best position ever found by that individual, and the group's best position.

In PSO, each particle of a swarm is considered as a point in an N-dimensional search space, which adjusts its movement according to its own experience as well as the experience of other particles. Each particle is represented by an N-parameter vector given by:

$$X_m = \{x_{1m}, x_{2m}, \ldots, x_{Nm}\} \, 1 \leq m \leq N_{POP} \quad (6)$$

where m is an integer and indicates the position of the particle in the swarm, which comprises $N_{POP}$ particles. For numerical evaluation of the quality of particles, a fitness function (FF) is defined and determined for each particle according to its optimization parameters. The algorithm initiates by randomly locating particles moving with random velocities. Velocity is the rate of a particle's position change and is represented by $V_m = \{v_{1m}, v_{2m}, \ldots, v_{Nm}\}$. The fitness function is calculated for all particles in the initial swarm. The best previous particle position ($P_{best}$) is set initially to the first random particle position, $P_m = \{p_{1m}, p_{2m}, \ldots, p_{Nm}\}$, and the position of the best particle in the swarm ($G_{best}$, as defined by the fitness function) is kept as the swarm's best position (G). The modification of the particle's position in (k+1)th iteration can be modeled as follows:

$$V_m^{k+1} = w V_m^k + c_1 \text{rand}_1() (P_m - X_m^k) + c_2 \text{rand}_2() (G - X_m^k) \quad (7)$$

$$X_m^{k+1} = X_m^k + V_m^{k+1} \Delta t \quad (8)$$

where w is the inertia weight, $c_1$ and $c_2$ are called cognitive and social rates, respectively, and $rand_1()$ and $rand_2()$ are two uniformly distributed random numbers between 0 and 1 [J. Robinson and Y. Rahmat-Samii, "Particle swarm optimization in electromagnetics," IEEE Trans. Ant. Propagat. 52, 397-407 (2004)]. Equation (7) shows that the new particle's velocity has memory of the previous velocity, its own best position, and the best position of the swarm. The position of each particle is then updated according to Eq. (8), in which $\Delta t$ is the time step (here $\Delta t=1.0$). Also, $P_m$ and G are updated based on the following rules:

$P_m$ update rule: if $FF(X_m^{k+1})$ is better than $FF(P_m)$,
then $P_m = X_m^{k+1}$ G update rule: if best of $FF(P_m, 1 \le m \le N_{POP})$ is better
than $FF(G)$, then $G$=best of $(P_m, 1 \le m \le N_{POP})$ The iterations continue, by returning to calculation of Eqs. (7) and (8), until either an optimum solution is obtained or the maximum number of iterations is met. To design a leaky-mode resonant element with PSO, particular parameters are chosen as optimization parameters; this may include grating thickness (d), period ($\Lambda$) and the fractions of period occupied by materials with alternating refractive index ($F_1$ to $F_3$) (see FIG. 2; $F_4=1-(F_1+F_2+F_3)$). Therefore, in this example, $X=\{\Lambda, d, F_1, F_2, F_3\}$ describes the leaky-mode resonant layer structure. The indices of refraction, $n_H$, $n_L$, $n_{inc}$ and $n_{sub}$ can be set to particular values appropriate for each design problem; alternatively, they may be made members of X. A PSO scheme with the above described formulation may be utilized to synthesize leaky-mode resonant elements with desired spectral responses. The number of particles in the swarm ($N_{POP}$) may be fixed to 20. Cognitive ($c_1$) and social ($c_2$) rates may be set to 1.49 or other typical values and inertia weight (w) may decrease linearly from 0.9 to 0.4 through iterations (maximum iteration is 10,000 in typical example runs). Absorbing boundary conditions may be utilized to limit the search in the predetermined search space [M. Shokooh-Saremi and R. Magnusson, "Particle swarm optimization and its application to the design of diffraction grating filters," Opt. Lett. 32, 894-896 (2007); J. Robinson and Y. Rahmat-Samii, "Particle swarm optimization in electromagnetics," IEEE Trans. Ant. Propagat. 52, 397-407 (2004)]. The fitness function (FF) may be taken to be a root-mean-squared (RMS) error function:

$$FF = \left\{ \frac{1}{M} \sum_{\lambda_i} [R_{desired}(\lambda) - R_{design}(\lambda)]^2 \right\}^{1/2} \quad (9)$$

in which $R_{desired}(\lambda)$ is the desired set of reflectances and $R_{design}(\lambda)$ is its designed counterpart provided by PSO. Here, M is the number of wavelength points ($\lambda_i$'s). Leaky-mode resonant optical elements can also be treated in a similar manner. RCWA may be used for diffraction efficiency calculations. The algorithm summarized here is referred to as standard, real-coded PSO, and is further discussed in M. Shokooh-Saremi and R. Magnusson, "Particle swarm optimization and its application to the design of diffraction grating filters," Opt. Lett. 32, 894-896 (2007).

Dispersive optical elements, as disclosed here, can be manufacture on a chip scale. They can be made using semiconductor materials and semiconductor manufacturing techniques.

In accordance with a preferred aspect of the present disclosure it is possible to design dispersive optical elements and to find the proper structural parameters for fabrication of these devices, as demonstrated by the following examples.

Example 1

Figure 2:
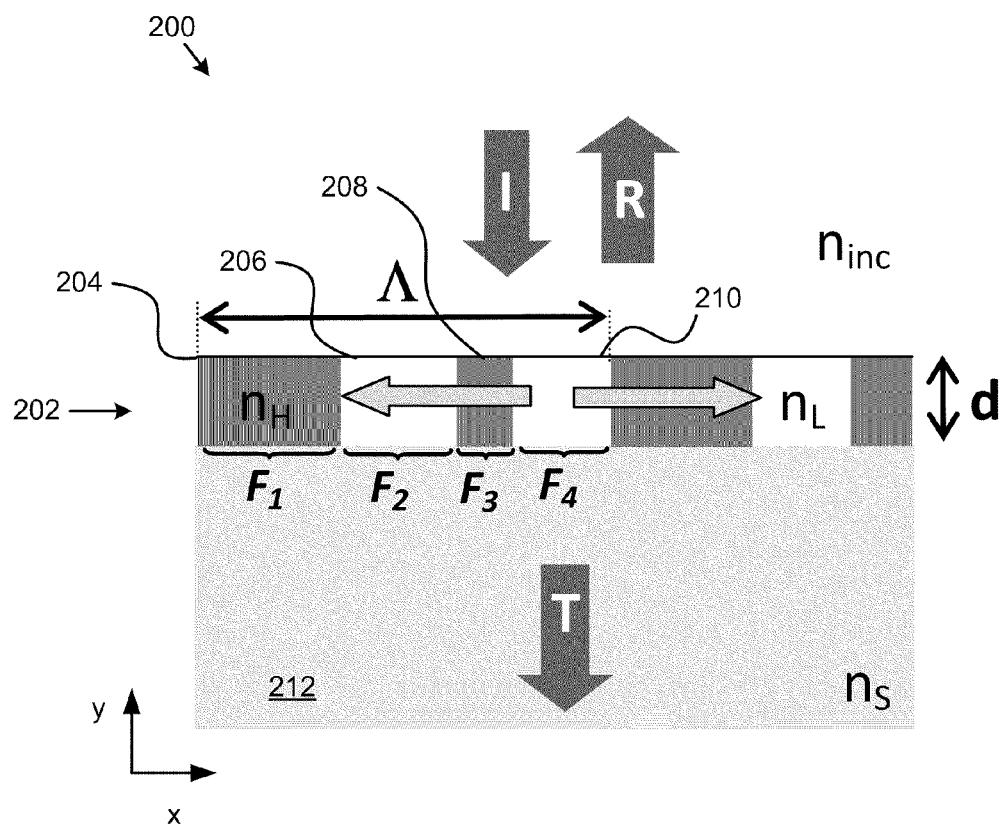
FIG. 2 shows a schematic view of a leaky-mode resonant element under normal incidence.

With reference to FIG. 2, an example of a silicon-on-insulator (SOI) leaky-mode resonant optical element 200 is disclosed. The spatially modulated periodic layer 202 is spatially modulated in the x-direction. It has alternating indices of refraction with a high index of refraction ($n_H$) and a low index of refraction ($n_L$). Components 204 and 208 have high indices of refraction, and components 206 and 210 have low indices of refraction. Components 204, 206, 208 and 210 comprise one period of the spatially modulated periodic layer. The period of spatially modulated layer 202 is denoted by $\Lambda$. Components 204, 206, 208 and 210 have widths in the x-direction of $\Lambda F1$, $\Lambda F2$, $\Lambda F3$, and $\Lambda F4$, respectively. Spatially modulated layer 202 has a depth shown by "d." Spatially modulated periodic layer 202 is disposed on a substrate 212 having an index of refraction denoted by "$n_S$." The index of refraction of the medium coupled to spatially modulated layer 202 and opposite of substrate 212 is denoted by $n_{inc}$. In this example, the medium above the spatially modulated periodic layer is air. The arrow labeled "I" represents incident light, the arrow labeled "R" represents reflected light, and the arrow labeled "T" represents transmitted light, which in this example is delayed in time compared to the incident light "I".

In this example, optical element 200 has a 0.5 nm spectral width and minimal sidelobes. Optical element 200 was designed using the PSO technique described above. This device is illustrated in FIG. 2 with parameters $\Lambda=979$ nanometers (nm), d=465 nm, and a period that is divided into four parts with fill factors $[F_1, F_2, F_3, F_4]=[0.071, 0.275, 0.399, 0.255]$. The fill factors represent the percentage that each component occupies in one period. In this example, component 204 occupies 7.1% of the period of 979 nm, or about 69.5 nm. Also, $n_H=3.48$, $n_S=1.48$, and $n_L=N_{inc}1.0$ (air).

Figure 3A:
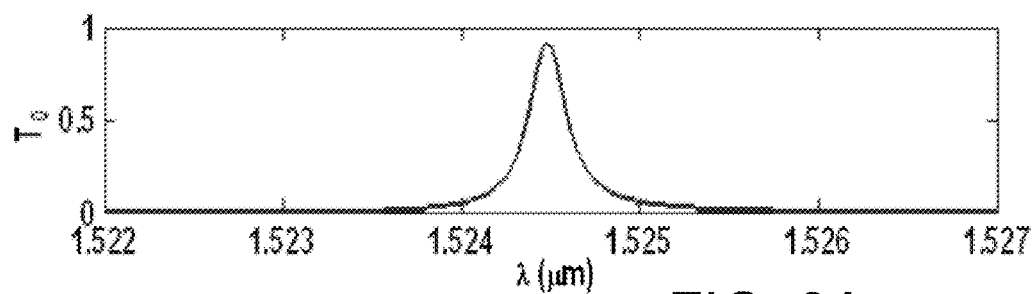
FIGS. 3A-D show the transmittance, phase, delay, and dispersion, respectively, of a 0.25 nanometer-wide (nm-wide) full width at half maximum (FWHM) silicon-on-insulator (SOI) leaky-mode resonant optical element.
Figure 3B:
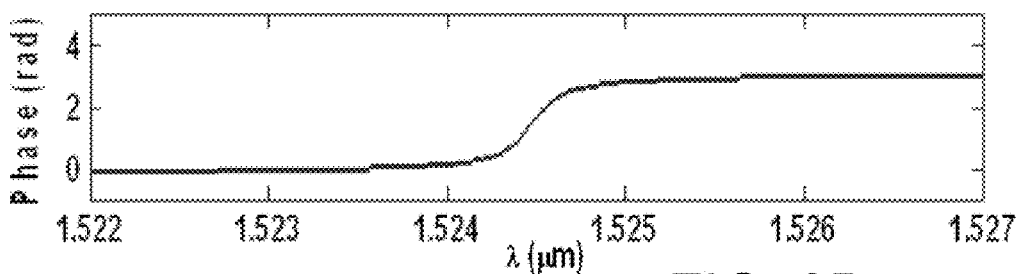
Figure 3C:
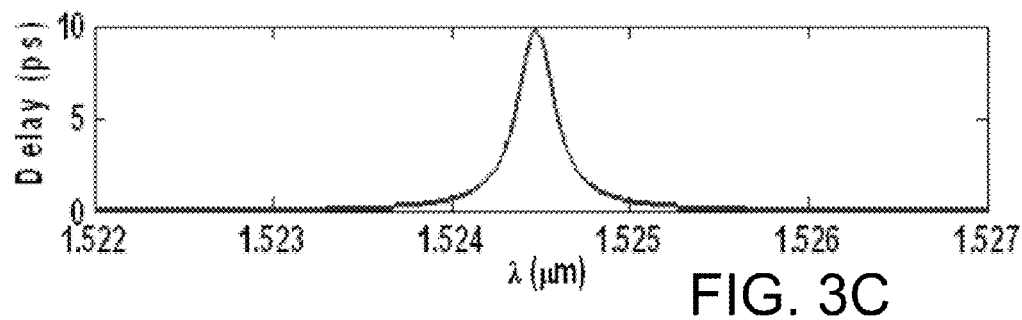
Figure 3D:
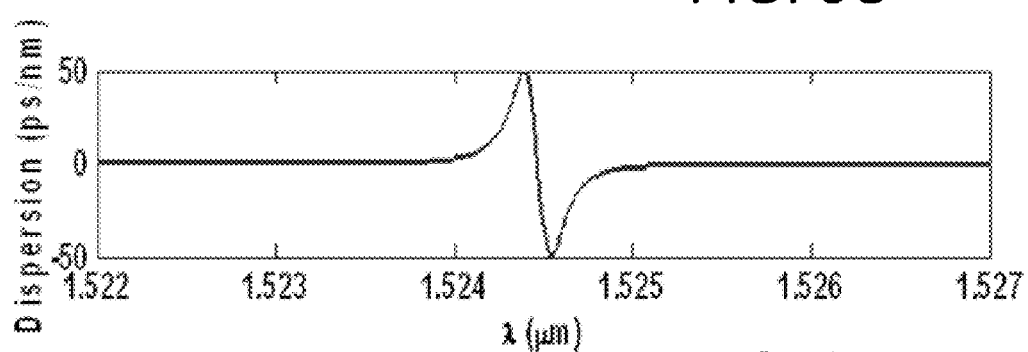
Figure 3E:
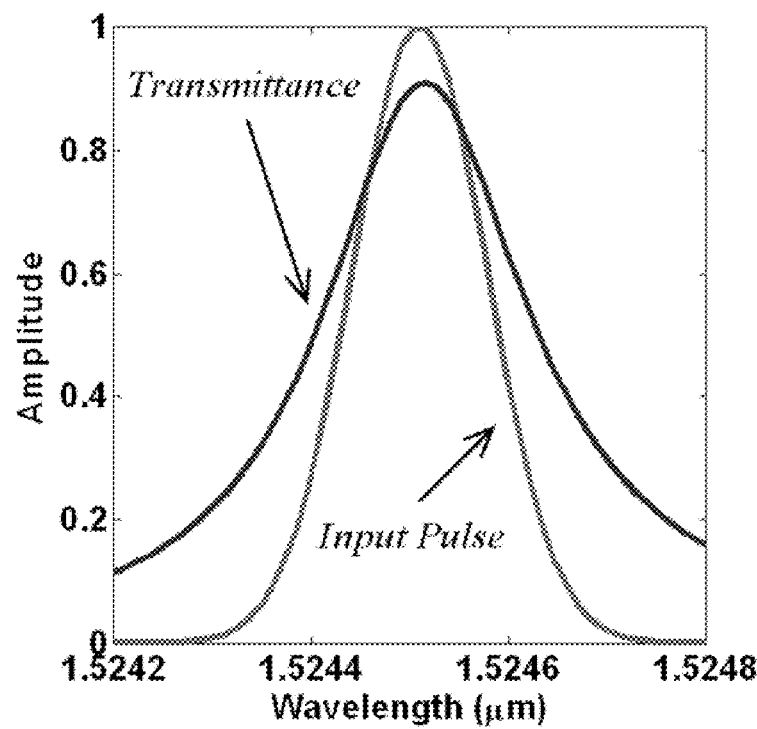
FIGS. 3E an F show frequency and time-domain responses of the optical element of FIG. 2 to excitation with a pulse.
Figure 3F:
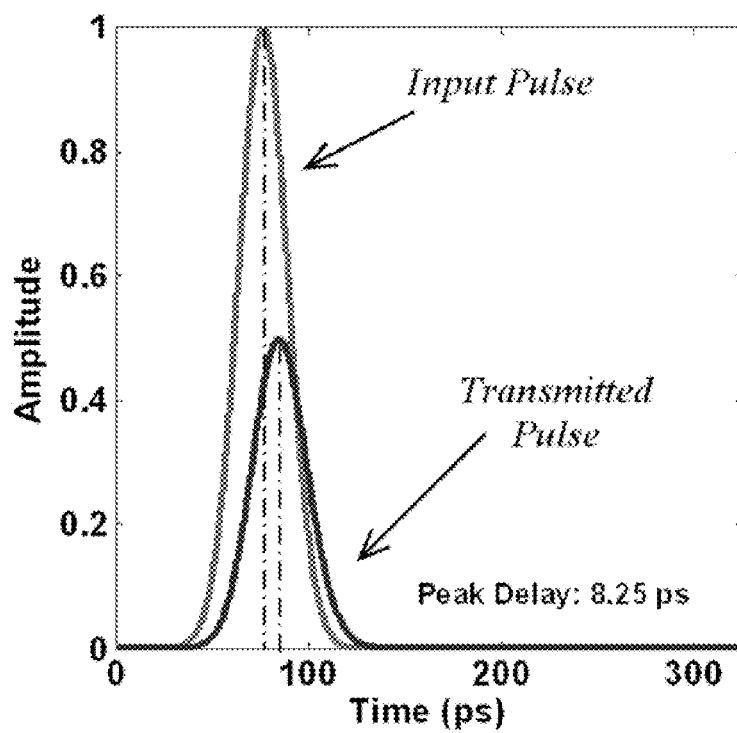

The device in FIG. 2 has a binary or rectangular grating profile, shown by components 204, 206, 208, and 210 each having a rectangular profile. In other embodiments, the profile of optical element 200 can have any of numerous other shapes, including trapezoidal (as often happens in practice when aiming for rectangular, vertical-wall profiles in fabrication), sinusoidal, triangular, etc. In addition, the patterning can have one-dimensional (1D) periodicity or two-dimensional (2D) periodicity. Optical element 200 in FIG. 2 has 1D periodicity because the optical components 204, 206, 208, and 210 are modulated in the x-direction. In some embodiments, an optical element may have 2D periodicity by being spatially modulated in the z-direction as well. FIGS. 3A-D show the transmittance, phase response, delay, and dispersion, respectively, of optical element 200 under normal incidence with TE polarization. Optical element 200 provides delays as high as ~10 picoseconds (ps) at the transmission resonance; however, the dispersion width is narrow and zero dispersion is obtainable only near 1524.5 nm. FIG. 3E shows the optical element's spectral response and the input pulse spectrum. FIG. 3F displays the response of this optical element to excitation with a pulse in the time domain. The input pulse has a width of 30 ps (full width and half maximum (FWHM)) in time. The output pulse experiences a delay of ~8.25 ps with respect to the input pulse. It has reduced amplitude as a result of the incomplete transmission and limited passband noted in FIG. 3E.

Example 2

Figure 4A:
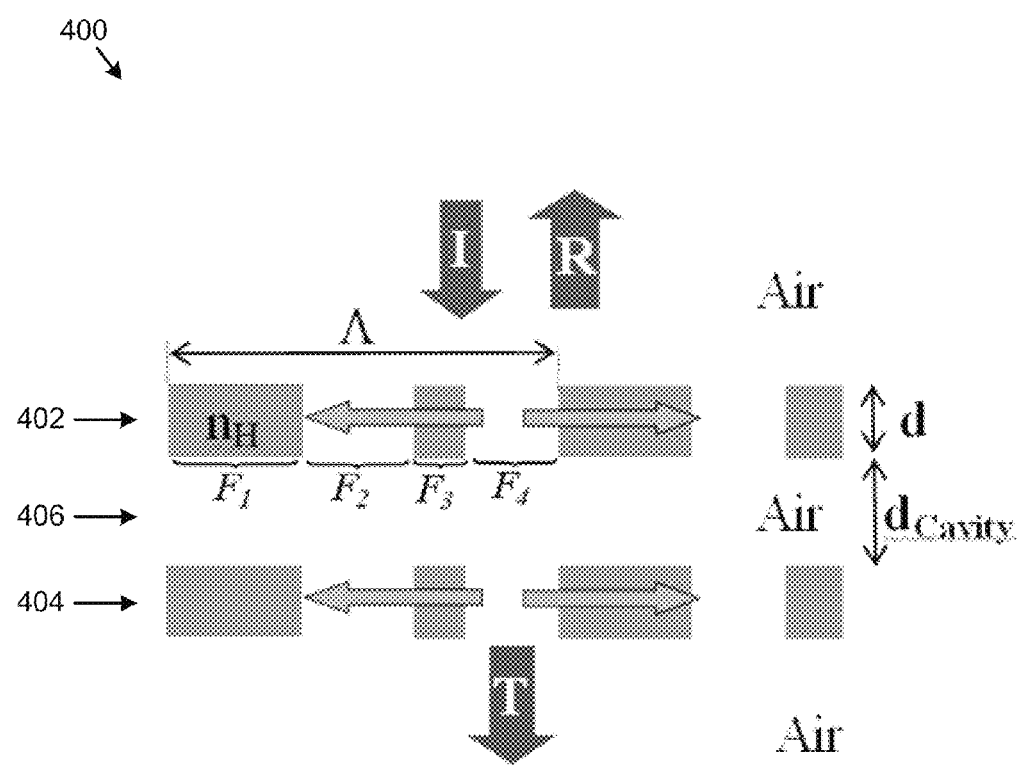
FIG. 4A shows a schematic representation of a single-cavity leaky-mode resonant optical element.
Figure 4B:
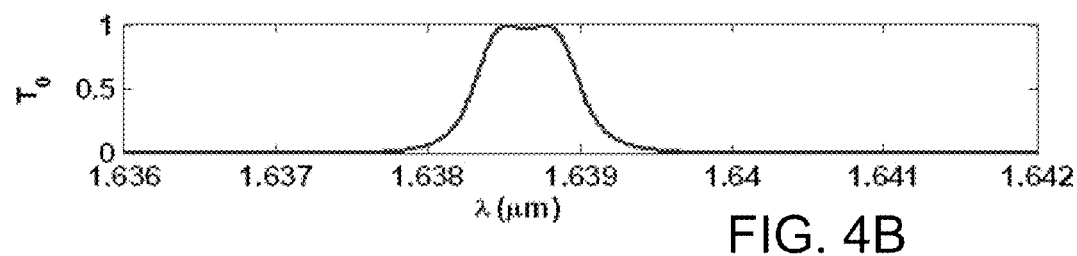
FIGS. 4B-E show the transmittance, phase, delay, and dispersion, respectively, of one embodiment of the optical element shown in FIG. 4A.
Figure 4C:
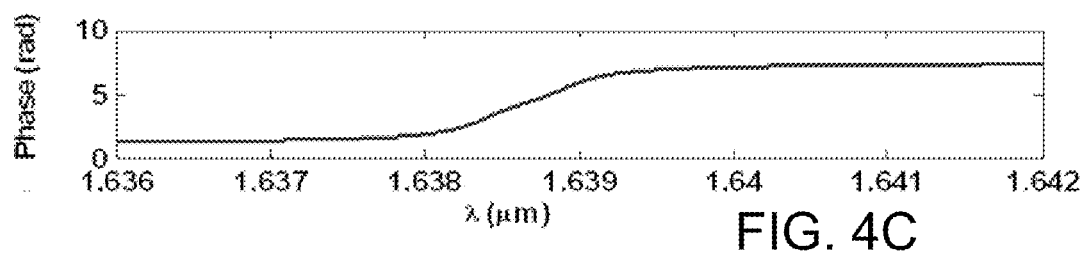
Figure 4D:
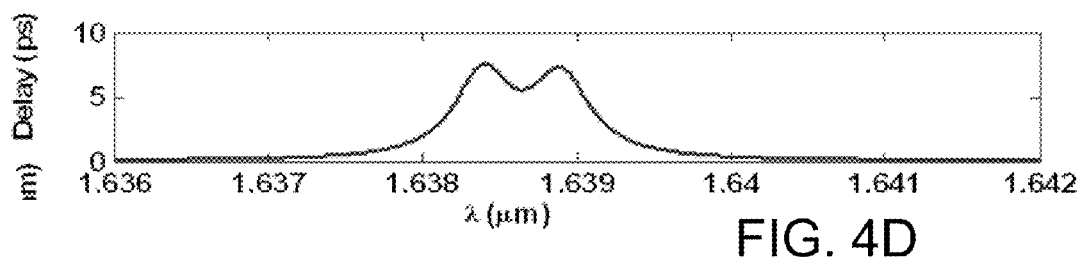
Figure 4E:
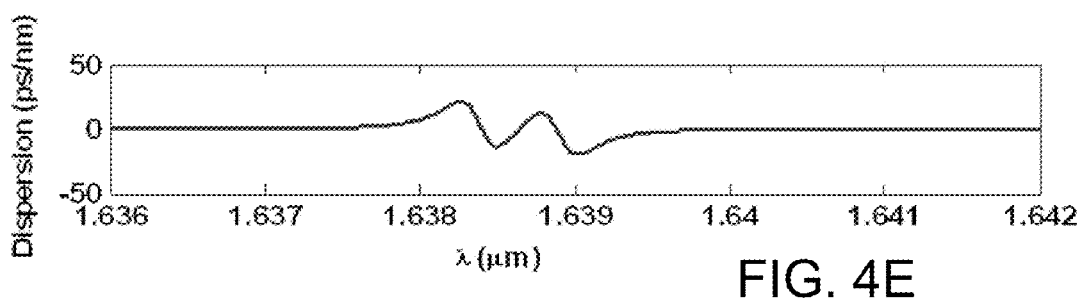
Figure 5A:
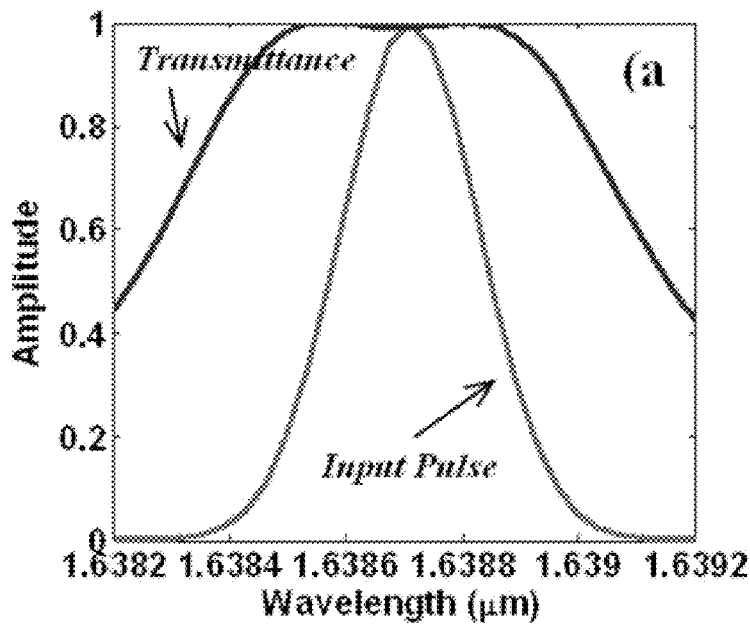
FIGS. 5A and B show the pulse response, in the frequency and time domains, of one embodiment of the optical element in FIG. 4A.
Figure 5B:
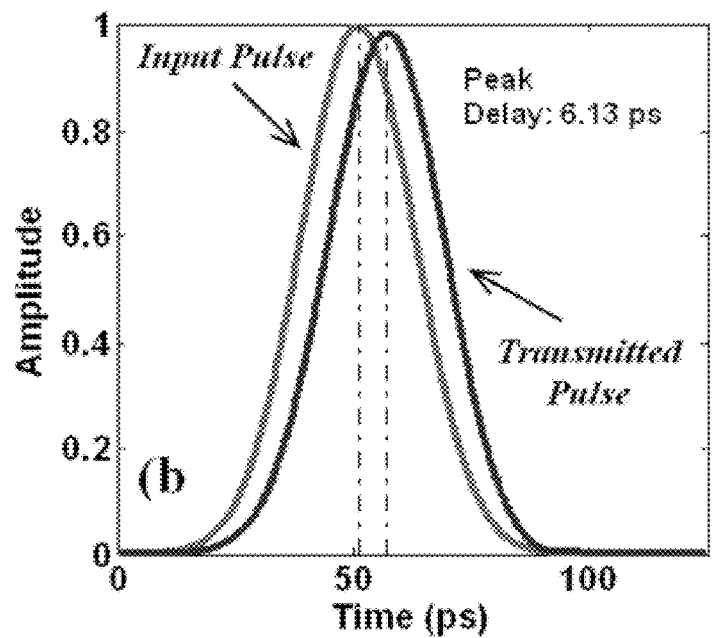

With reference to FIG. 4A, a second example is disclosed. In this example, optical element 400 includes two spatially modulated periodic layers 402 and 404, which are similar to spatially modulated periodic layer 202 shown in FIG. 2. Optical element 400 has an air gap (cavity) 406 between layers 402 and 404 to realize a ~0.75 nm (FWHM) flat-top transmission band as shown in FIG. 4B. Again, this optical element was designed by the PSO technique described above, and its structural parameters are: $\Lambda$=1103.9 nm, d=432.2 nm, [$F_1$, $F_2$, $F_3$, $F_4$]=[0.0626, 0.3013, 0.4576, 0.1785], and $d_{Cavity}$=2000 nm. FIGS. 4B-E illustrate the transmittance, phase, delay, and dispersion of this device, respectively. This element shows a flat-top transmission bandwidth, which is a result of merging two adjacent narrow transmission resonances. In addition, the delay response exhibits an average of ~7 ps in the transmission band. In comparison to the previous example, the dispersion is flatter. FIGS. 5A and B show the response of this optical element 400 in wavelength and time domains, respectively. The input pulse has a full-width half-maximum (FWHM) of 20 ps in time and spectrally fits inside the transmission bandwidth of the optical element. The input pulse is delayed by ~6.1 ps by being transmitted through this optical element, which corresponds to the delay shown in FIG. 4D.

Example 3

Figure 6A:
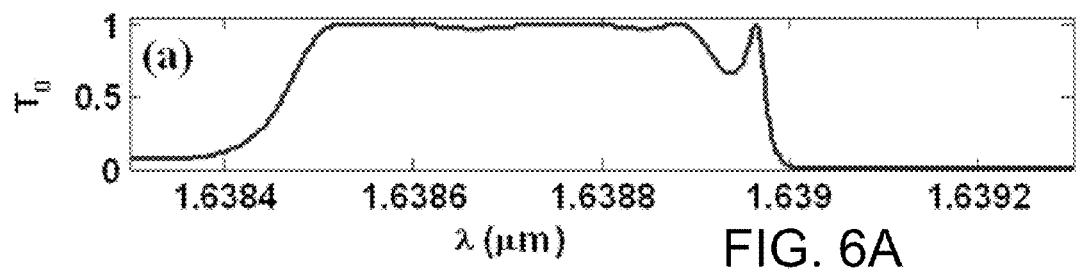
FIGS. 6A-D shows the transmittance, phase, delay, and dispersion, respectively, of one embodiment of a five-cavity leaky-mode resonant optical element.
Figure 6B:
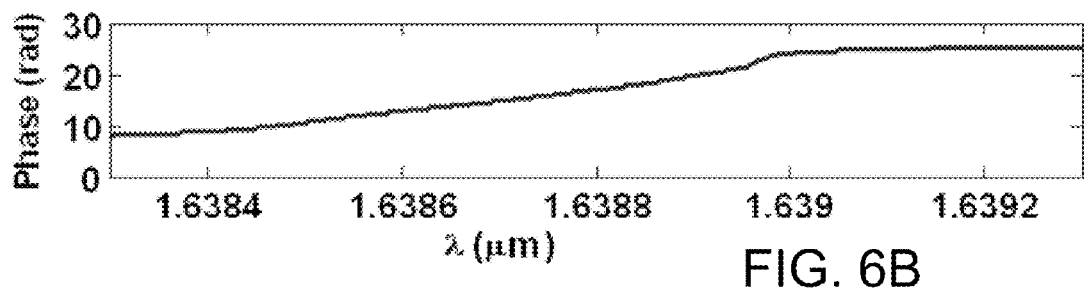
Figure 6C:
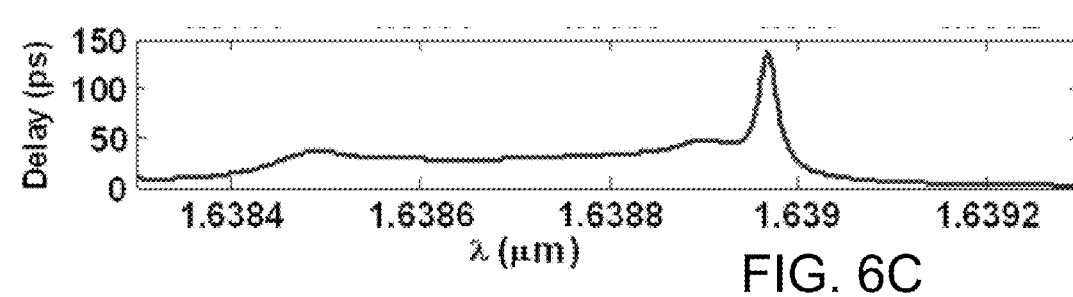
Figure 6D:
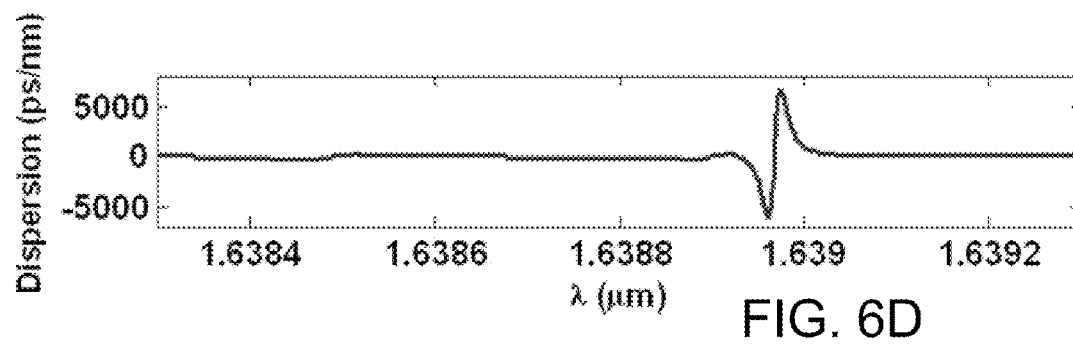
Figure 6E:
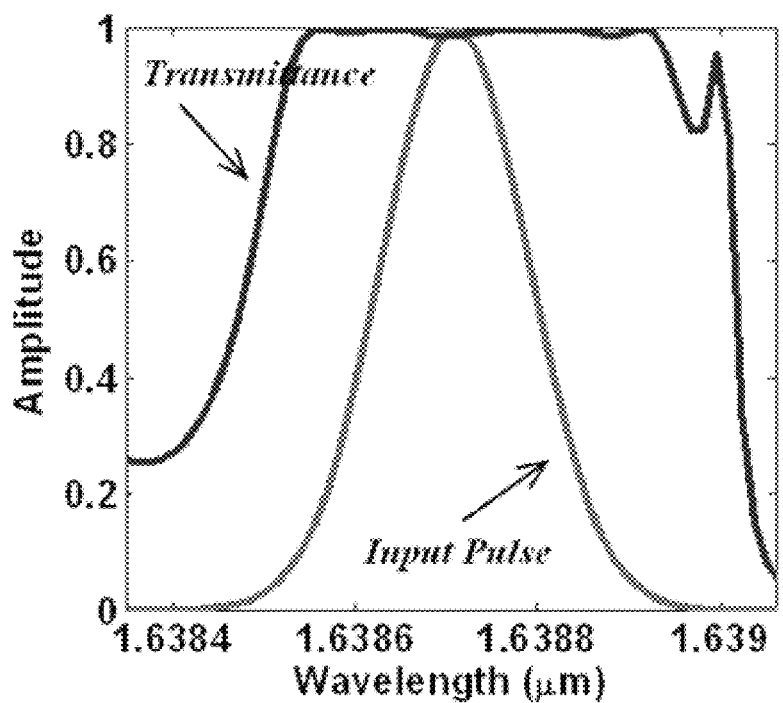
FIGS. 6E and F show the pulse response, in the frequency and time domains, of one embodiment of a five-cavity leaky-mode resonant optical element.
Figure 6F:
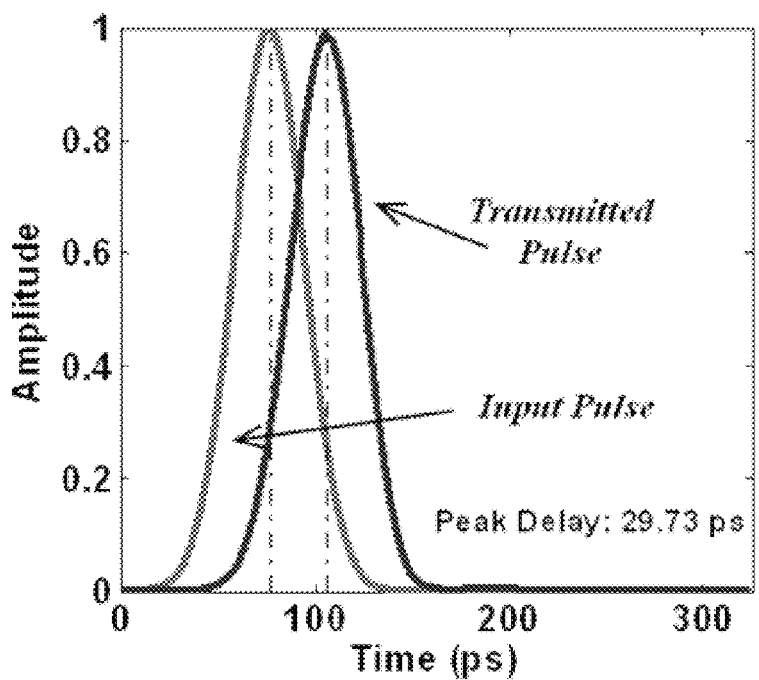

By cascading the structure in FIG. 4A, we can design an optical element resembling a multi-cavity photonic crystal waveguide. To illustrate, we cascaded five leaky-mode resonant subunits ($N_{Cavity}$=5) with spacing $d_B$=5.0 micrometers (μm). The resulting optical element resembles the structure shown in FIG. 4A, but has ten spatially modulated periodic layers instead of two. FIGS. 6A-D show the computed results of the transmittance, phase, delay, and dispersion, respectively. Although the high-transmission bandwidth is smaller than it is for a single-layer optical element, cascading the layers results in a flat delay response of ~30 ps over a ~0.5 nm wavelength band. Moreover, the flat low-dispersion response illustrates that such optical elements may be used for imposing constant (and almost dispersion-free) delays on optical pulses. Theoretically, this ~30 ps group delay for the ~34 μm long optical element designed here corresponds to a group velocity of ~0.0038 c (where "c" is the speed of light). FIGS. 6E and F display the response of this optical element to pulse excitation. The input pulse has a FWHM of 30 ps, and the output pulse preserves its shape with a delay of ~30 ps with respect to the input pulse. For comparison, using a coupled-resonator optical waveguide (CROW), Notomi et al. reported 75 ps delay with 60 cavities each being about 2100 nm in diameter; the total structure length was 175 μm [M. Notomi, E. Kuramochi, and T. Tanabe, "Large-scale arrays of ultra-high-Q coupled nanocavities," Nature Photon. 2, 741-747 (2008)].

Example 4

Figure 7:
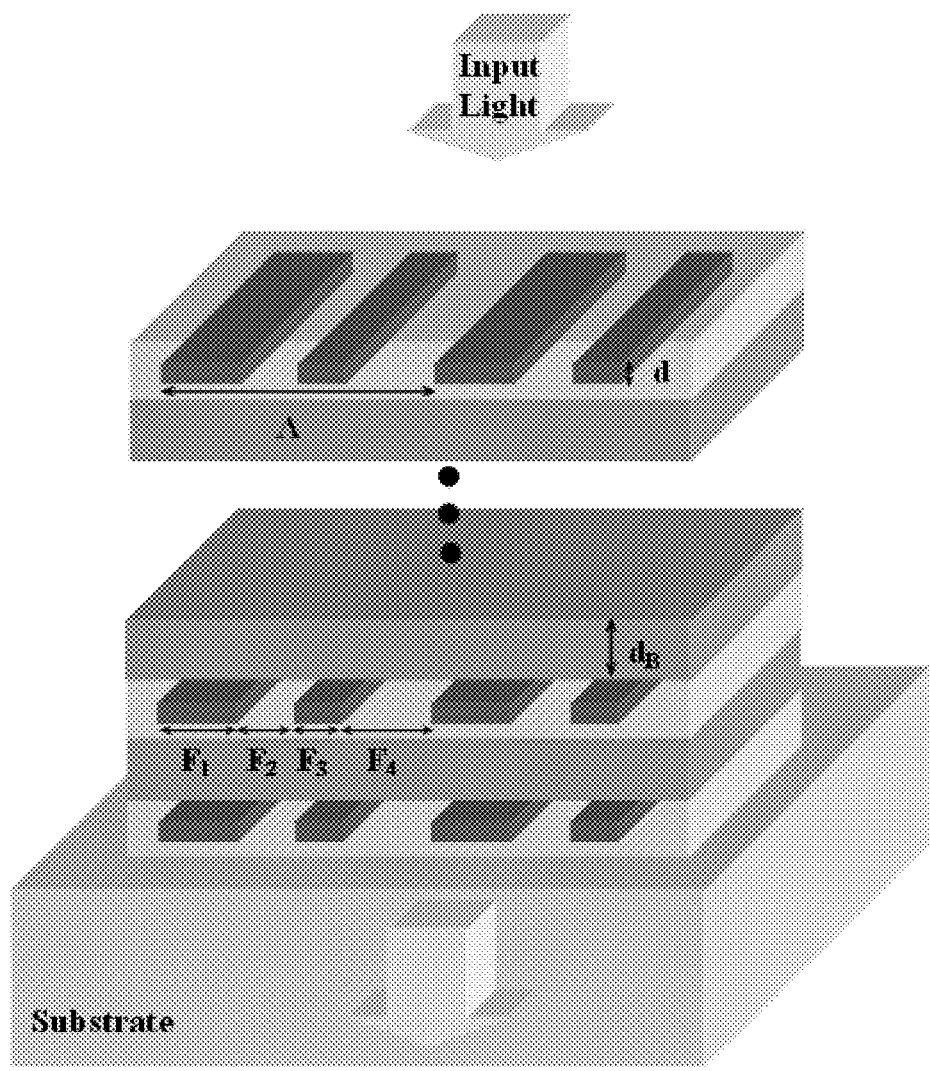
FIG. 7 shows a multilayer implementation of an example leaky-mode resonant slow-light device.

FIG. 7 shows a multilayer implementation of a leaky-mode resonant slow-light optical element. In this type of realization, each leaky-mode resonant layer (like the one shown in FIG. 2) would be fabricated as a planar device over previously deposited layers or fabricated elements. To pattern the grating area, electron-beam lithography or UV holography can be employed. Dry etching techniques can be used to transfer the pattern into the corresponding layer. The complete slow-light optical element may be formed by adding vertically (as drawn) the required number of leaky-mode resonant layers. This realization is based on a combination of thin-film device technology (along the vertical direction) and leaky-mode resonant patterned layers (in the lateral direction). Stacked-layer devices like this do not employ transverse waveguide-type confinement of the input light and can be labeled bulk devices in contrast to a design that uses a slab- (or channel-) type waveguide confinement as presented next.

Figure 8A:
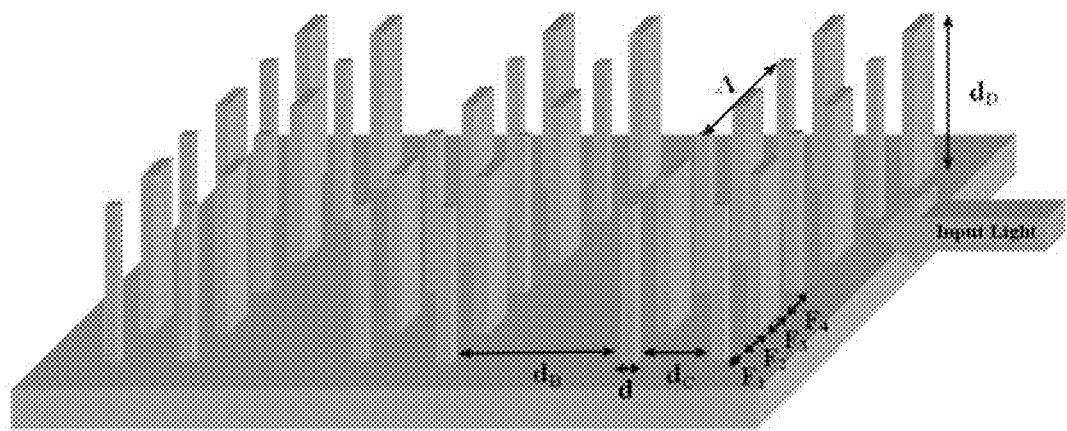
FIGS. 8A and B show schematic views of two conceptual planar implementations of exemplary leaky-mode resonant slow-light devices.

FIG. 8A shows a conceptual planar implementation of leaky-mode resonant slow-light optical elements. If the device height $d_D$) is large, the device will function as a bulk element. Each sub-ridge layer in FIG. 8A is a leaky-mode resonant layer like shown in FIG. 2. If one designs the sub-layer to operate as a bandpass filter, the input light will resonate transversely and be reradiated forward to the next leaky-mode resonant layer. This idea can also be implemented with a series of leaky-mode resonant optical elements on numerous substrates cascaded as a horizontal stack. The concept in FIGS. 8A and B is convenient in that a large number of cascaded resonant units can be fabricated in a few steps by e-beam lithography (EBL) and deep reactive ion etching (DRIE), resulting in a compact system of resonant delay units. There is considerable flexibility in design and layout possible as these examples show, though the dimensions of the device and the input beam size should be specified with practical limitations in mind. On the other hand, if thickness $d_D$) is small, such as on the order of 100-300 nm, these can be waveguide elements. In that case, the functionality of the device will employ waveguiding in a dual sense. First, there is the waveguide that will guide light from one resonant layer to the next. For that to work, the structure requires a higher average refractive index than that of the surrounding media, as usual. A membrane in air will satisfy this requirement, with additional considerations if the device is placed on a substrate. That is, the refractive index of the substrate must be considered in ensuring that the resonant element acts as a waveguide. Second, each leaky-mode resonant layer forms a resonant waveguide, again similar to the one shown in FIG. 2. In principle, a large number of these leaky-mode resonant layers vertically or horizontally to achieve a specified delay with layouts as depicted in FIGS. 8A and B, or numerous alternate ones.

FABRICATION

The present leaky-mode resonance elements may be fabricated using a variety of methods and materials. Device patterning may be conducted with conventional photolithography, nanoimprint lithography, electron-beam lithography, and laser holographic interference lithography. Standard etching and thin film deposition processes are applicable in the fabrication steps. Etching and pattern transfer may be performed using reactive-ion etching (RIE) (for shallow gratings) and deep RIE (DRIE; for deep gratings). Inspection by scanning electron microscope (SEM) and atomic force microscope (AFM) may be used for assessment of the processed devices. Optical spectral characterization can be done with tunable lasers, wide-band supercontinuum sources, and matched spectrum analyzers. Fast pulse lasers, wide-bandwidth oscilloscopes, and sensitive detectors may be applicable for testing the devices.

Figure 8B:
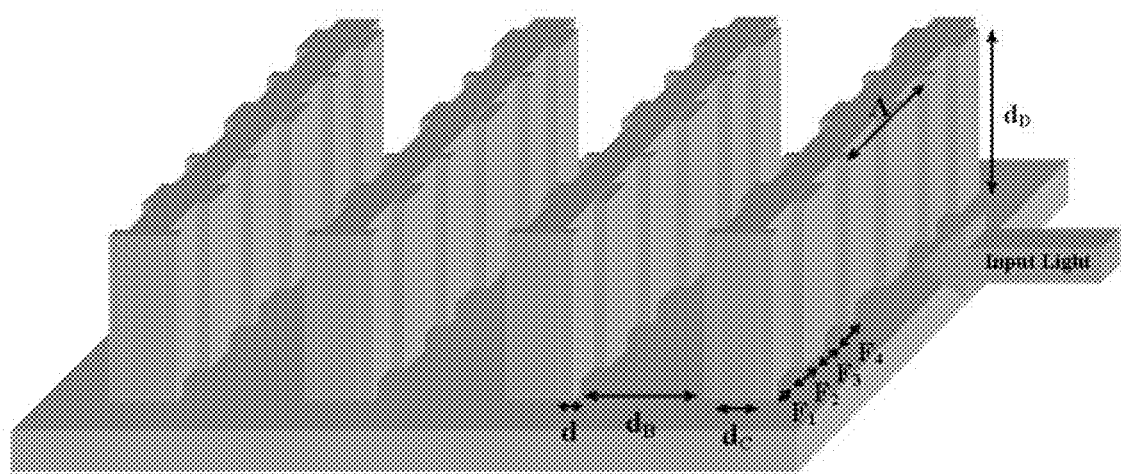

The number of fabrication steps depends on the level of pattern complexity, as those of ordinary skill in the art will understand from the examples presented herein. Some devices will be simple to process. For example, the devices in FIG. 8 and other similar elements, may be fabricated by first depositing a silicon layer by e-beam evaporation, sputtering, or chemical vapor deposition (CVD) on the substrate, spinning a resist layer on the silicon layer, patterning it in 2D in a predetermined manner according to numerical design by e-beam lithography or by laser interference lithography, developing the resist, and using it as a mask for RIE or DRIE etching to create the pattern in the Si medium. Inspection by SEM and AFM may be used for verification of the features such as fill factors, surface conditions, and layer thicknesses of the processed devices.

METHODS

Inputting light into embodiments of the present slow-light optical elements may be accomplished with standard waveguide-coupling techniques and structures. Verification of the spectral response for testing purposes may be done with tunable lasers, wide-band supercontinuum sources, and matched spectrum analyzers.

All of the present methods can be practiced without undue experimentation in light of the present disclosure. While the present devices and methods have been described in terms of preferred embodiments, it will be apparent to those of skill in the art that variations may be applied to these devices and methods without departing from the scope of the claims.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A method for delaying transmitted light, comprising:
   illuminating a leaky-mode resonant element with a first light pulse for a time period of no more than 1 nanosecond, where the first light pulse has a first pulse shape;
   where the leaky-mode resonant element is configured so that some of the light is transmitted in a delayed manner;
   where the transmitted light is a second pulse that has a second pulse shape, and
   where the first pulse shape is substantially the same as the second pulse shape.

2. The method of claim 1, where the time period is less than 100 picoseconds.

3. The method of claim 1, where the light has a wavelength of 1.5 µm to 1.6 µm.

4. The method of claim 3, where the time period is greater than 5 picoseconds.

5. The method of claim 3, where the time period is greater than 25 picoseconds.

6. The method of claim 1, where the light has a wavelength of 1.6 µm to 1.7 µm.

7. The method of claim 6, where the time period is greater than 5 picoseconds.

8. The method of claim 6, where the time period is greater than 25 picoseconds.

9. The method of claim 1, where the leaky-mode resonant element comprises a spatially modulated periodic layer that includes silicon.

10. The method of claim 1, where the leaky-mode resonant element comprises a spatially modulated periodic layer that includes germanium.

11. The method of claim 1, where the leaky-mode resonant element comprises a plurality of spatially modulated periodic layers.

12. The method of claim 11, where the leaky-mode resonant element comprises a cavity between a first spatially modulated periodic layer and a second spatially modulated periodic layer.

13. The method of claim 1, where the leaky-mode resonant element comprises a spatially modulated periodic layer having one-dimensional periodicity.

14. The method of claim 13, where the spatially modulated periodic layer has two-dimensional periodicity.

15. The method of claim 1, where the leaky-mode resonant element comprises a spatially modulated periodic layer having a profile selected from the group consisting of binary profile, rectangular profile, trapezoidal profile, sinusoidal profile, and triangular profile.

16. A method for delaying transmitted light, comprising:
    receiving, at a leaky-mode resonant element, a first light pulse for a time period of no more than 1 nanosecond, where the first light pulse has a first pulse shape;
    where the leaky-mode resonant element is configured so that some of the light is transmitted in a delayed manner;
    where the transmitted light is a second pulse that has a second pulse shape, and
    where the first pulse shape is substantially the same as the second pulse shape.

17. A method of delaying transmitted light, comprising:
    illuminating a leaky-mode resonant element with two or more distinct pulses of light, where each distinct pulse of light has a first pulse shape;
    where the leaky-mode resonant element is configured so that at least some of each distinct pulse of light is transmitted in a delayed manner;
    where each transmitted pulse of light has a second pulse shape, and
    where the first pulse shape is substantially the same as the second pulse shape.

18. The method of claim 17, where the illuminating comprises illuminating a leaky-mode resonant element with two or more distinct pulses of light over a time period of no more than one second.

19. A method of delaying transmitted light, comprising:
    receiving, at a leaky-mode resonant element, two or more distinct pulses of light, where each distinct pulse of light has a first pulse shape;
    where the leaky-mode resonant element is configured so that at least some of each distinct pulse of light is transmitted in a delayed manner,
    where each transmitted pulse of light has a second pulse shape, and
    where the first pulse shape is substantially the same as the second pulse shape.

20. The method of claim 19, where the receiving comprises receiving, at a leaky-mode resonant element, two or more distinct pulses of light over a time period of no more than one second.

21. The method of claim 1, where the first pulse shape and the second pulse shape are Gaussian.

22. The method of claim 16, where the first pulse shape and the second pulse shape are Gaussian.

23. The method of claim 17, where the first pulse shape and the second pulse shape are Gaussian.

24. The method of claim 19, where the first pulse shape and the second pulse shape are Gaussian.

* * * * *